A. E. CAIN.
FRICTIONAL TRACTOR GEARING.
APPLICATION FILED JAN. 14, 1921.
1,435,584.
Patented Nov. 14, 1922.
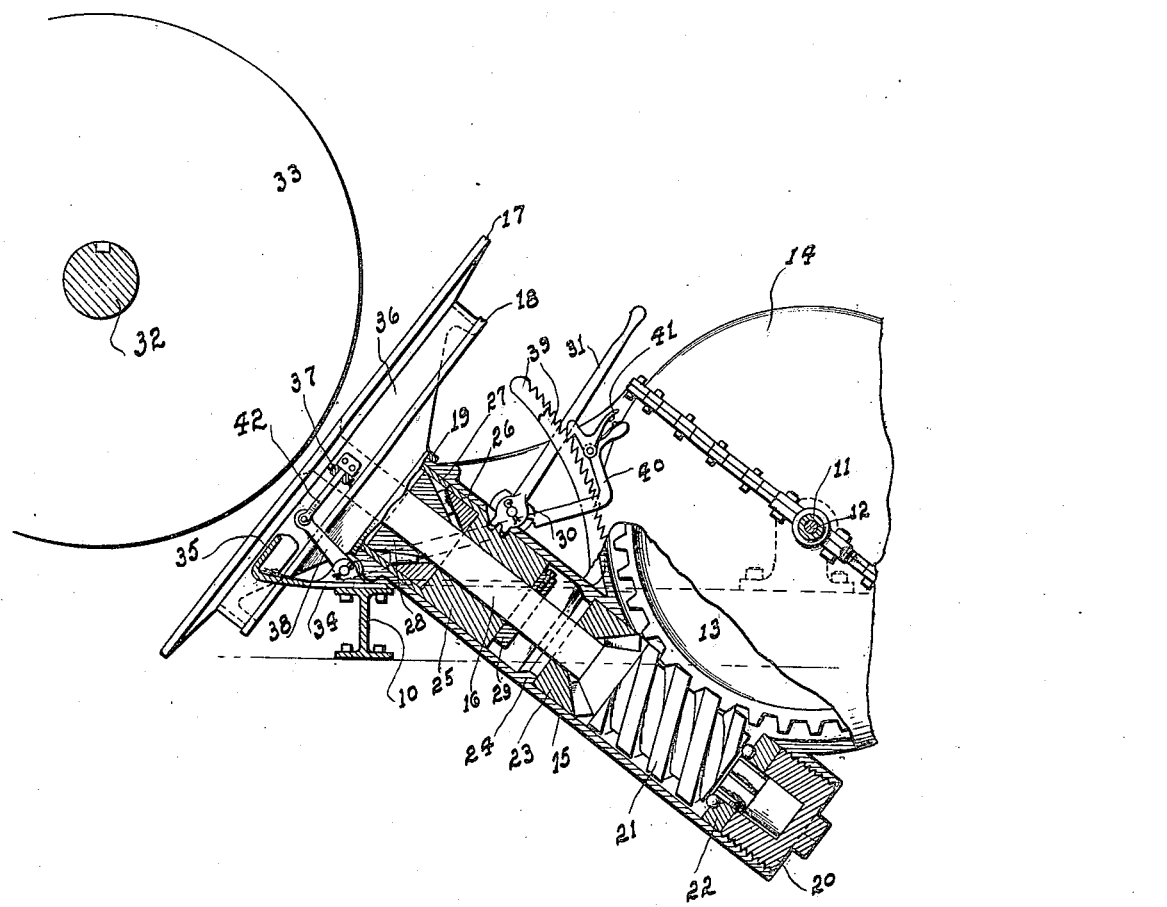
Inventor
A. E. Cain.
By
Lacey & Lacey, Attorneys Patented Nov. 14, 1922.

1,435,584

UNITED STATES PATENT OFFICE.

ALVAH E. CAIN, OF PHILIPSBURG, MONTANA.

FRICTIONAL TRACTOR GEARING.

Original application filed September 20, 1919, Serial No. 325,064. Divided and this application filed January 14, 1921. Serial No. 437,254.

*To all whom it may concern:*

Be it known that I, ALVAH E. CAIN, a citizen of the United States, residing at Philipsburg, in the county of Granite and State of Montana, have invented certain new and useful Improvements in Frictional Tractor Gearing, of which the following is a specification.

This invention relates to an improved frictional gearing, being a division of my pending application for tractor, filed September 20, 1919, Serial No. 325,064.

Among other objects, the invention seeks to provide a gearing particularly adapted for use in connection with a tractor, a gearing which will operate dependably, and a gearing which may be readily manipulated.

Other and incidental objects will appear hereinafter.

The figure of the drawing is a fragmentary sectional view showing the gearing of the present invention in connection with associated parts of the structure of a tractor as illustrated in my pending application referred to.

In order to clearly bring out the construction and mounting of the present gearing, I have, for convenience, shown said gearing in connection with associated parts of a tractor as illustrated in my pending application previously referred to. A sill of the tractor frame is indicated at 10. Upon said frame is suitably journaled a sleeve 11 to which is connected one of the drive wheels of the tractor, said drive wheel not being shown, and loosely fitted through said sleeve is the rear axle 12 of the tractor. In carrying the invention into effect I employ a worm wheel 13 which is fixed to the sleeve 11 and surrounding said worm wheel is a sectional housing 14. Integrally formed upon said housing is a cylindrical casing 15 secured at its upper end portion to the sill 10 and inclining downwardly and rearwardly beneath the worm wheel 13, being supported at its rear end portion by the housing. Journaled in said casing is a drive shaft 16 carrying, at its upper end, a friction disc 17. The disc is provided with a brake drum 18 from which depends a flange 19 freely surrounding the upper end of the casing. Closing the casing at its lower end is a threaded plug 20 recessed to loosely receive the lower end of the drive shaft and splined upon the lower end portion of said shaft is a driving worm 21 coacting with the worm wheel 13. Interposed between the plug 20 and the lower end of the worm 21 is an anti-friction bearing 22 while at the upper end of said worm is arranged a roller bearing 23 held by an annular shoulder 24 within the casing. Surrounding the drive shaft above the shoulder 24 is a sleeve 25 provided at its upper end with a flange 26 and seated against this flange is a ring 27. Disposed within the flange and ring is a roller bearing 28 held between the sleeve 25 and the inner end of the friction disc. This bearing while thus rotatably supporting the drive shaft 16 will also hold the sleeve 25 against upward movement, and adjustably fixed upon the shaft below the sleeve is a collar 29 holding the sleeve against downward movement. Rising from the upper end portion of the casing 15 is a socket 30 and pivoted in said socket is a shift lever 31 provided at its inner end with teeth coacting with teeth upon the sleeve 25. Suitably mounted upon the tractor frame in advance of the disc 17 is a power shaft 32 and splined upon said shaft is a friction wheel 33. Thus, as will be clear, the lever 31 may be operated for sliding the shaft 16 through the worm 21 to either elevate the friction disc 17 into engagement with the friction wheel to be driven thereby, or lower the disc out of engagement with the wheel. By sliding the wheel along the shaft 32, said wheel may be shifted relative to the axis of the disc for varying the speed of rotation of the disc.

Suitably fixed upon the sill 10 is a plate 34 upon which is a head 35 and connected at one end thereof to said head is a flexible brake band 36 extending around the drum 18 of the disc 17 and secured at its opposite end to an arm 37. Mounted to rock upon the plate 34 is a bell crank 38, the long arm of which is freely received between arcuate rack posts 39 upstanding from the plate near its rear end. Formed on said arm at its rear end is an upwardly directed terminal 40 provided with a handle and having a catch 41 pivoted thereon to cooperate with the rack posts. Connecting the short arm of the bell crank with the arm 37 is a link 42. Thus, as will be clear, by lifting the rearwardly projecting long arm of the bell crank, the brake band 36 may be tightened about the brake drum of the friction disc for braking the disc and accordingly braking the shaft 16.

Having thus described the invention, what is claimed as new is:

1. In a power driven vehicle, a longitudinally movable drive shaft, a friction disc fixed thereon, a casing housing the shaft and provided with an internal shoulder, a worm slidably receiving the shaft therethrough but coupled to the shaft to turn therewith, an anti-friction bearing coacting between said shoulder and one end of the worm, a plug closing the casing at one end, an anti-friction bearing coacting between said plug and the opposite end of the worm, and means for shifting the shaft longitudinally.

2. In a power driven vehicle, a longitudinally movable drive shaft, a friction disc fixed thereon, a casing housing the shaft and provided with an internal shoulder, a sleeve slidably fitting in said casing surrounding the shaft, an anti-friction bearing coacting between one end of the sleeve and said disc, a collar fixed upon the shaft coacting with the opposite end of the sleeve whereby the sleeve is held against longitudinal movement on the shaft, a lever pivoted upon the casing directly engaging at its inner end with said sleeve and operable for shifting the shaft longitudinally, a worm slidable upon the shaft but coupled thereto to turn with the shaft, means closing the casing at one end, and anti-friction bearings coacting with the ends of said worm and sustained one by said means and the other by said shoulder.

In testimony whereof I affix my signature.

ALVAH E. CAIN. [L. S.]